Figure 1:
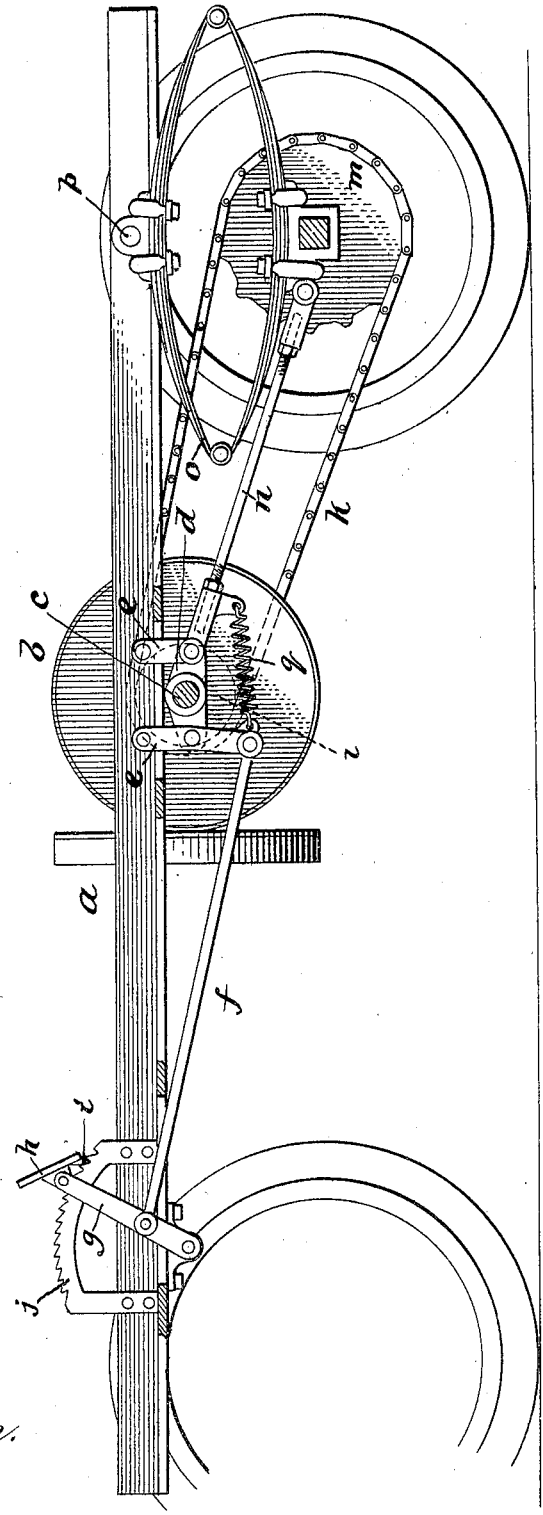

No. 807,623. PATENTED DEC. 19, 1905.
J. W. LAMBERT.
MOTOR VEHICLE.
APPLICATION FILED APR. 3, 1905.

2 SHEETS—SHEET 1.

Witnesses
F. C. Gibson.
Nellie Yates

Inventor
John W. Lambert
By Davis & Davis
Attorneys

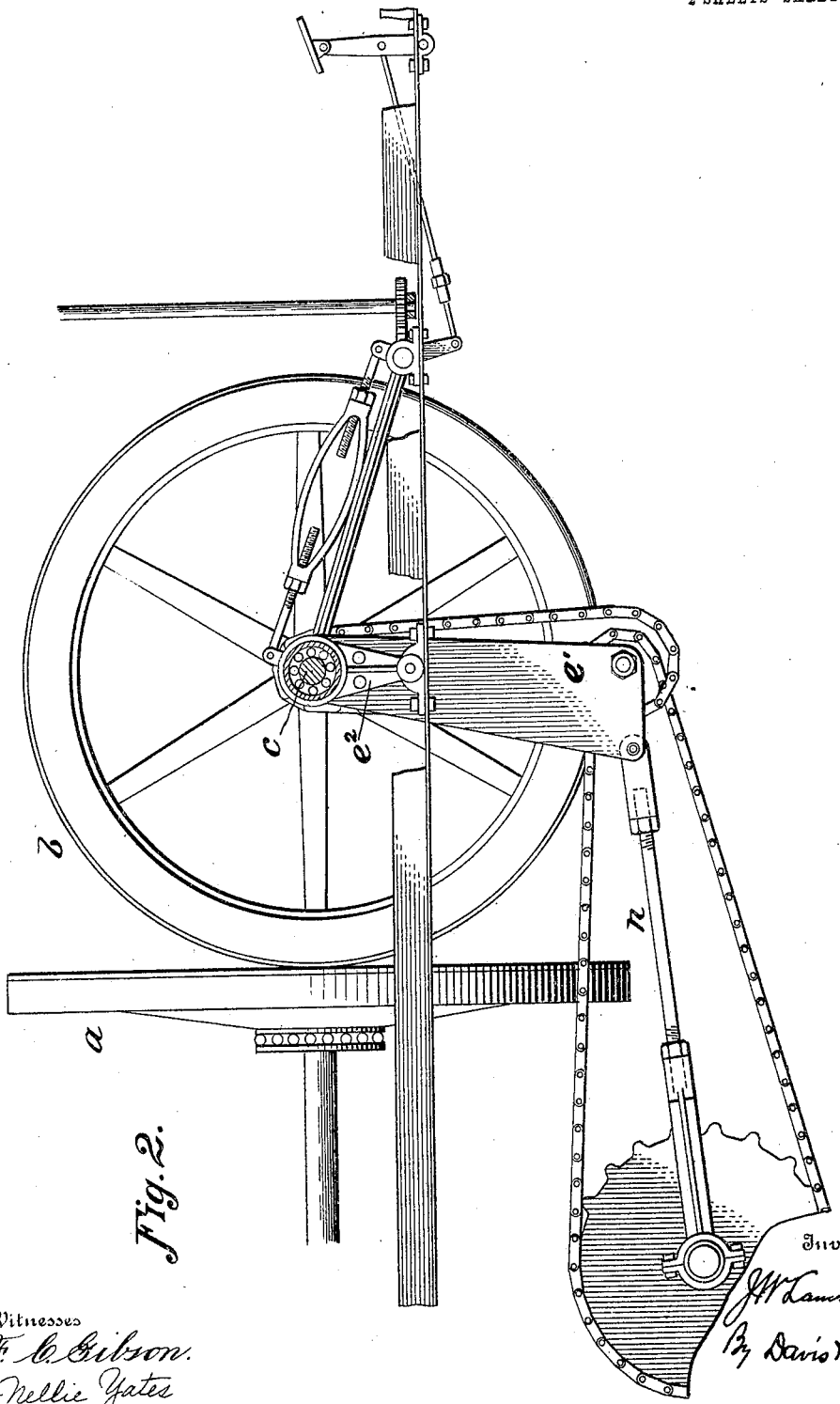

UNITED STATES PATENT OFFICE.

JOHN W. LAMBERT, OF ANDERSON, INDIANA.

MOTOR-VEHICLE.

No. 807,623.　　Specification of Letters Patent.　　Patented Dec. 19, 1905.

Application filed April 3, 1905. Serial No. 253,469.

*To all whom it may concern:*

Be it known that I, JOHN W. LAMBERT, a citizen of the United States of America, and a resident of Anderson, county of Madison, State of Indiana, have invented certain new and useful Improvements in Motor-Vehicles, of which the following is a full and clear specification, reference being had to the accompanying drawings, in which—

Figure 1 is a side elevation of a chassis provided with my improvements. Fig 2 is a side elevation of a portion of the same, showing a modification.

My present improvements have relation to that type of motor-vehicle gearing in which the power is transmitted from the drive-shaft of the engine by a pair of coacting friction-wheels, one of the wheels having its periphery bearing on the face of the other and being movable radially thereacross for the purpose of varying the speed and reversing the motion.

The object of the present improvements is to provide simple mechanism for shifting the movable friction-wheel to and from the face of the drive-disk without affecting the degree of tautness of the drive-chains, as more fully hereinafter set forth To the accomplishment of this object and such others as may hereinafter appear the invention consists of the parts and combination of parts hereinafter fully described, and particularly pointed out in the appended claims, reference being had to the accompanying drawings, forming a part of this specification, in which the same reference characters designate like parts throughout both views.

Referring to the drawings by letters, $a$ designates the friction drive-disk, which is adapted to be driven by the engine in any suitable manner; $b$, the driven disk, which is, as usual, slidably mounted on the transverse shaft $c$, mounted in the bearings $d$, which are pivotally suspended from the main frame by depending links $e$. To throw the bearings $d$ to and fro, I extend the forward link $e$ downward and pivotally connect to its lower extremity a rod $f$, which extends forward and is pivotally connected to a foot-lever $g$, which is provided with a pedal $h$ within convenient reach of the chauffeur and which is provided with a pawl $i$, coöperating with the segmental ratchet $j$, so that the driven wheel may be forced against the driving-disk and held there with the desired degree of pressure.

The rear wheels are driven by sprocket-chains $k$ and sprocket-wheels $l$ and $m$, and each chain is adjusted as to tautness by a rigid adjusting-rod $n$, pivotally connected to the rear axle at its rear end and pivotally connected at its forward end to the rear end of bearing $d$, preferably by the same bolt that pivotally connects the lower end of the rear link $e$ to said bearing.

The rear springs $o$, supporting the rear axle, are pivotally connected at their upper sides at $p$ to the side bars of the frame. The depending end of each of the front links $e$ is connected by a retractile spring $q$ to a depending lug on the connection $n$.

As stated, to engage and disengage driven wheel $b$ and the drive-disk the chauffeur simply manipulates the pedal $h$. To vary the speed by shifting driven wheel $b$ across the face of the driving-disk, suitable devices, well known and not shown herein, are employed. It will be obvious that when the bearings $d$ are shifted back and forth to stop and start the driving mechanism the stiff rods $n$ will swing the rear axle back and forth to a corresponding degree upon the pivots $p$, thus preserving the tautness of the drive-chains. The spring $q$ tends to draw the foot-lever, connecting-rod $f$, and connected parts rearward and normally hold the driven disk away from the drive-disk, so that by simply disengaging pawl $i$ from the ratchet-bar the driving mechanism will be disengaged and the vehicle will stop.

In Fig. 2 my present invention is applied to a transmission-gear of the type shown in my former patent, No. 730,930, dated June 16, 1903, the depending bracket $e'$ instead of being loosely hung on the driven shaft being rigidly connected to the swinging bearings $e^2$, which in this type of gear stand upright on the frame instead of depending therefrom, as shown in Fig. 1. The arrangement of sprocket wheels and chains and the shifting mechanism (shown in Fig. 2) are the same as shown in my aforesaid patent, and a detail description thereof is therefore unnecessary herein. It will be understood also that in this modification the springs supporting the rear axle are pivotally attached to the frame the same as in Fig. 1, so that as the bearings are swung backward and forward the rear axle will be correspondingly shifted.

It will be apparent to those skilled in the art that various mechanical embodiments of the invention are possible, and I therefore do not wish to be limited to the exact arrangement and construction shown.

What I claim, and desire to secure by Letters Patent, is—

1. In a motor-vehicle the combination of a driving-disk, a driven disk and a shaft carrying this latter disk, movable bearings on this shaft, means for shifting these bearings to engage and disengage the driven disk, springs pivotally depending from the frame of the vehicle and supporting the rear axle thereof, so that said axle may move bodily forward and backward, sprocket-wheels connected to the rear wheels, sprocket-wheels on the driven shaft and chains connecting said sprocket-wheels, and adjustable rod connections between the rear axle and said movable bearings, for the purpose set forth.

2. In a motor-vehicle the combination of a frame, a rear axle and means for connecting it to said frame in such manner as to permit it to have a bodily movement forward and backward, a driving-disk, a driven disk mounted on a shaft, bodily-movable bearings for said shaft and means for shifting these bearings to engage and disengage the driven disk, sprocket-chain connections between said driven shaft and the rear wheels, and stiff adjustable connections between the rear axle and said movable bearings.

3. In a motor-vehicle, the combination of a frame mounted on front and rear axles and wheels, the rear axle being bodily movable forward and backward, a driving-disk, a driven disk supported in movable bearings, means for shifting these bearings to engage and disengage the friction-wheels, pivotal rigid adjustable connections between said movable bearings and the rear axle, whereby said rear axle will move bodily to and fro with the driven shaft, and driving connections between said driven shaft and the rear wheels, substantially as set forth.

4. In a motor-vehicle, the combination of a frame mounted on front and rear axles and wheels, the rear axle being bodily movable forward and backward, a driving-disk, a driven disk supported in movable bearings, means for shifting these bearings to engage and disengage the friction-wheels, pivotal rigid adjustable connections between said movable bearings and the rear axle, whereby said rear axle will move bodily to and fro with the driven shaft, driving connections between said driven shaft and the rear wheels, and spring connections between said shifting means and said rigid adjustable connections for the purposes set forth.

In testimony whereof I hereunto affix my signature, in the presence of two witnesses, this 25th day of March, 1905.

JOHN W. LAMBERT.

Witnesses:
GEO. A. LAMBERT,
B. F. LAMBERT.